United States Patent [19]

Noma et al.

[11] Patent Number: 5,014,761
[45] Date of Patent: May 14, 1991

[54] RADIAL TIRE FOR MOTORCYCLE WITH IMPROVED METALLIC BELT CORD

[75] Inventors: Hiroyuki Noma, Hyogo; Tadao Kouno; Kazuo Kadomaru, both of Osaka, all of Japan

[73] Assignee: Sumitomo Rubber Industries, Ltd., Hyogo, Japan

[21] Appl. No.: 291,595

[22] Filed: Dec. 29, 1988

[30] Foreign Application Priority Data

Jan. 8, 1988 [JP] Japan .................................. 63-2675

[51] Int. Cl.⁵ .......................... B60C 9/20; B60C 3/04; D02G 3/48
[52] U.S. Cl. .................................. 152/527; 152/451; 152/454; 152/556
[58] Field of Search ............... 152/451, 537, 527, 564, 152/554, 560, 556; 57/902, 237

[56] References Cited

U.S. PATENT DOCUMENTS

| 1,689,119 | 10/1928 | Evans .................. 152/451 X |
| 3,090,190 | 5/1963 | Boussu et al. .............. 57/902 |
| 3,192,984 | 7/1965 | Bourdon ................. 152/537 X |
| 3,310,094 | 3/1967 | Prevost .................. 152/537 |
| 4,176,513 | 12/1979 | Young et al. ............. 152/451 |
| 4,757,850 | 7/1988 | Nakasaki et al. .......... 152/554 X |
| 4,773,463 | 9/1988 | Okuni et al. ............. 152/560 X |

FOREIGN PATENT DOCUMENTS 57-55203 4/1982 Japan .................................. 152/564

Primary Examiner—Michael W. Ball
Assistant Examiner—Adrienne C. Johnstone
Attorney, Agent, or Firm—Birch, Stewart, Kolasch & Birch

[57] ABSTRACT

A radial tire for motorcycle, in which the steering stability at high running speed is improved and the ply separation at the breaker edges is lessened. The tire comprises: a radial carcass extending between bead portions of the tire; a tread disposed radially outside the carcass; and a breaker disposed between the carcass and the tread and having at least one ply of metallic cords coated with rubber; each metallic cord comprising a plurality of twisted strands; each strand consisting of at least three twisted filaments made of metal; the elongation of each metallic cord when loaded when 1.0 kgf/cord being in a range of 0.5 to 1.5%; the tangential modulus of elasticity of each metallic cord when loaded with 10 kgf/cord being in a range of 8,000 to 15,000 kgf.sq.mm.

12 Claims, 2 Drawing Sheets

RADIAL TIRE FOR MOTORCYCLE WITH IMPROVED METALLIC BELT CORD

BACKGROUND OF THE INVENTION

The present invention relates to a radial ply tire for motorcycles, and more particularly to an improvement in the breaker reinforcement, which improves the steering stability at high running speed, and lessens the ply separation at the breaker edges.

According to recent developments of motorcycles, the running speed has increased. Therefore, motorcycle tires are also required to be improved in various characteristics under high speed running.

In general, for the carcass of a motorcycle tire, there has been employed the cross-ply structure, in which the cords of each ply are arranged at 25 to 60 degrees to the circumferential direction of the tire so as to cross with the cords of the next ply. This is because the requirements for motorcyle tires are radically different from those for four-wheel vehicles such as passenger cars, particularly with respect to tire behavior during cornering.

That is, a motorcycle, during cornering, is tilted at a large bank angle with respect to a plane perpendicular to the road surface. Therefore, it is necessary for the tire to have such characteristics as being able to produce a stably camber trust (a force parallel with the road surface in the same direction as the bank) to balance with the centrifugal force acting upon the motorcycle.

Accordingly, the motorcycle tires must be transversely stiffened, and this used to be done by employing a cross-ply type carcass as described above so as to provide and maintain the camber trust. Thus a radial ply structure, inferior to the cross ply structure in transverse stiffness has seldom been used.

The cross-ply tire, however, has such drawbacks that the resistance to wear is poor, and transverse vibrations known as the weave phenomenon of the motorcycle frame are caused during high speed running. Accordingly, as countermeasure for such problems, increasing the stiffness of the tire as a whole by, for examples, arranging the carcass cord angle, increasing the number of carcass plies. and/or the like has been employed, but this could not completely remove the drawbacks of the cross ply structure.

Recently, therefore, it has been proposed to use a radial ply carcass for motorcycle tires to try to solve the above-mentioned drawbacks of the conventional cross-ply construction.

On the other hand, it has been known that when the radial ply carcass is applied to the motorcycle tires, which needs breaker reinforcement, separation of the edge portions of the breaker ply from the surrounding rubber frequently occurs unlike passenger car tires. This is explained as follows:

As shown typically in FIG. 2(a), in motorcycle tires, the radius of curvature of the tread is small, that is, the tread is round, and the camber value H/L is large. On the other hand, the breaker ply is extended across the whole width of the tread. As a result, the tension of the breaker cords in the tread center region becomes different from that in the tread edge regions, and the stress concentrates in the breaker edges. Further, the tread is subjected to repeated deformation from the tire unloaded or free state of FIG. 2(a) to the loaded or ground contacting state of FIG. 2(b) and vice versa. And when the tread is deformed into the ground contacting state from the free state, the radius of curvature of the inner surface of the tire shoulder is decreased to R2 (FIG. 2(b)) from R1 (FIG. 2(a)). As a result, shear stress is generated on the breaker edge portions because they are located in such regions.

It has also been proposed to use low elasticity modulus cords, such as nylon cords, in place of steel cords generally used for the breaker cords of radial tires. In this case, however, due to the resultant low rigidity of breaker, the steering stability becomes poor, and the growth of the tire when inflated becomes large.

SUMMARY OF THE INVENTION

It is therefore an object of the present invention to provide a radial tire for motorcycles in which the ply separation at the breaker edges is lessened, and the steering stability at high speed running is improved, and further the tire growth in the tread region is reduced.

According to one aspect of the present invention, a radial tire for a motorcycle comprises a radial carcass extending between the bead portions of the tire, a tread disposed radially outside the carcass, and a breaker disposed between the carcass and the tread and having at least one ply of metallic cords coated with rubber. Each of the metallic cords comprises a plurality of twisted strands, and each strand consists of at least three twisted filaments made of metal, wherein the elongation of each cord when loaded with 1.0 kgf/cord, is in a range of 0.5 to 1.5%, and the tangential modulus of elasticity (or modulus of elasticity in shear) of each cord when loaded with 10 kgf/cord, is in a range of 8,000 to 15,000 kgf/sq.mm.

BRIEF DESCRIPTION OF THE DRAWINGS

An embodiment of the present invention will now be described in detail by way of example only with reference to the accompanying drawings, in which.

DETAILED DESCRIPTION OF THE INVENTION

Figure 1:
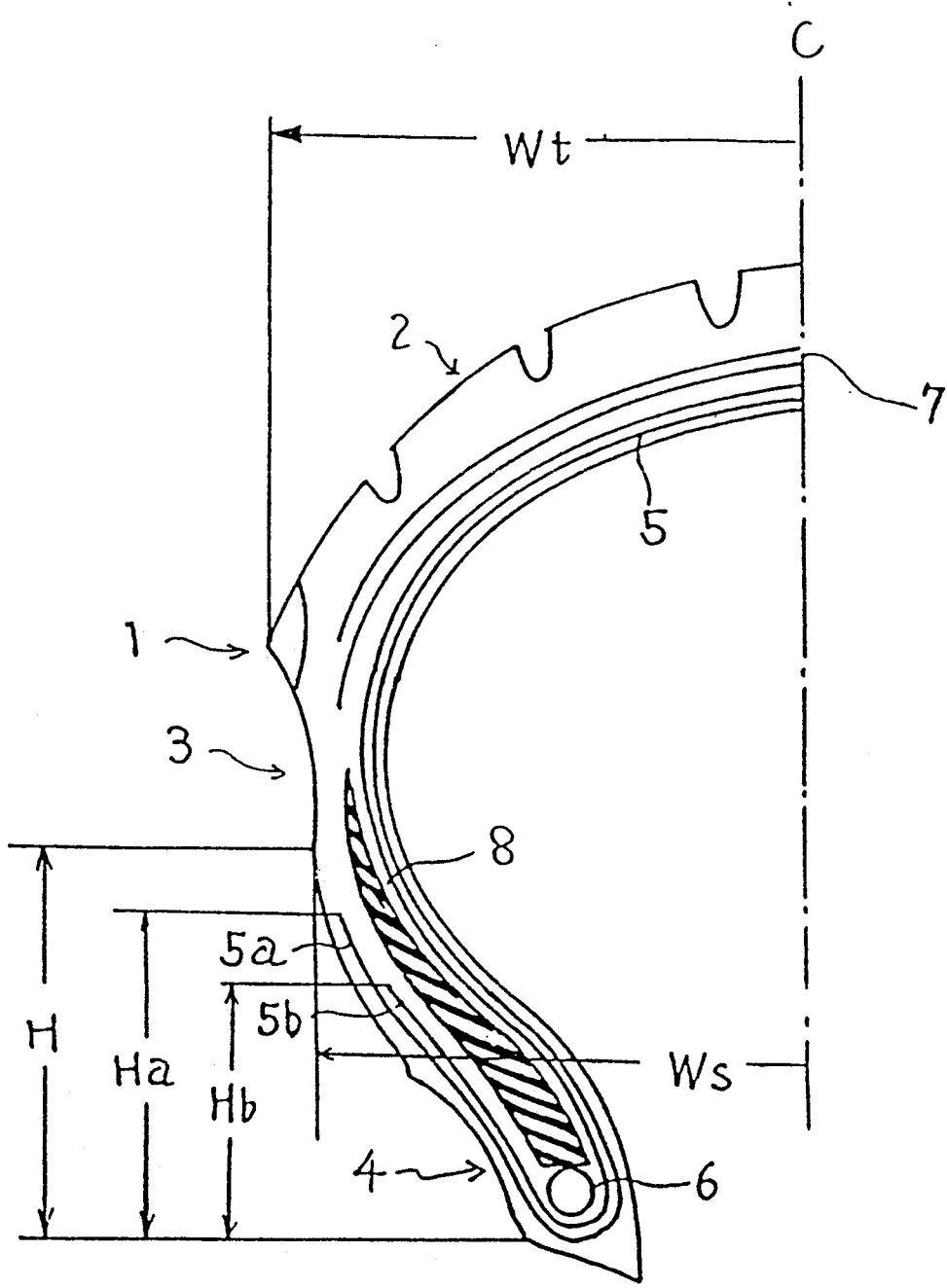
FIG. 1 is a sectional view of a left half of a radial tire for a motorcycle showing an embodiment of the present invention.

In FIG. 1, the tire 1 has a tread portion 2, a pair of sidewall portions 3 extending radially inwardly one from each edge of the tread, and a pair of bead portions 4 positioned at the radially inward ends of the sidewall portions, respectively.

The tire 1 comprises: a pair of bead cores 6 one disposed in each bead portion; a carcass 5 extended from one bead portion to the other bead portion through the sidewall portions and tread portion; a tread; a pair of sidewalls; and a breaker 7 disposed radially outward of the carcass and between the tread and the carcass.

The tread 2 is disposed radially outside the crown of the carcass, and the tread rubber is constructed so that (a) the contour of the tread becomes parallel with the profile of the carcass crown, (b) the thickness of the tread becomes constant from the crown center towards each tread edge, or (c) the thickness of the tread decreases from the crown center towards each tread edge. In order to maintain the camber thrust stably, even when the tire is titled largely, the axial extent of the tread is set so that the width Wt between the tread edges becomes larger than the tire maximum section width Ws at the sidewall portions 3.

The carcass 5 has two plies, at least one ply of which is turned up in both edge portions around the bead cores 6 from the axially inside to the outside thereof and terminates at a certain position in the bead portion or sidewall portion.

Preferably, the end of the carcass ply turnup 5a is extended radially outward beyond the end of the carcass ply turnup 5b which is located axially inside the turnup 5a to completely cover the inner turnup 5b, thereby mitigating the stress concentration on the end of the inner turnup 5b.

Further, to reinforce the sidewall portions 3, the height Hb of the inner turnup 5b and the height Ha of the outer turnup 5a from the bead base, are respectively set in a range of 55 to 65% and 70 to 150% of the height H of the maximum section width (Ws) point from the bead base.

Next, the carcass cords are arranged parallel or approximately parallel to the radial direction of the tire. The "approximately parallel" means that the cords are arranged at not more than 20 degrees to the radial direction of the tire. If the cord angle exceeds 20 degrees, the excellent characteristics of the radial tire exhibited during high speed running would not be obtained.

For the carcass cord, an organic fiber cord whose modulus of elasticity is 200 to 1500 kgf/sq.mm, for examples, nylon, rayon, polyester and so on, is preferably used. In case that 1500 to 4000 denier organic fiber cords are used as carcass cords, the cords are arranged parallel with each other and preferably embedded in rubber whose 100% modulus ranges from 25 to 75 kgf/sq.cm at a density ranging from 35 to 60 cords/5 cm.

Incidentally, in addition to the above-mentioned carcass structure in which the carcass ply is turned up around the bead cores from the inside to the outside, a structure in which the carcass is turned up reversely from the outside to the inside or a combination structure of the two may be applied to the carcass of the present invention. FIG. 1 shows, however, the preferred structure.

The breaker 7 is composed of a plurality of plies of rubber coated metallic cords, at least one ply of which has a substantially same width as the tread.

The breaker cord comprises a plurality of twisted strands, each consisting of at least three twisted filaments made of steel, and for examples, $3 \times 3$, $3 \times 4$ structures are preferably employed. Therefore, the rubber can infiltrate into the cord, and as the result, the adhesion between the breaker cords and the rubber is improved. Moreover, the steel cords are protected from corrosion.

Further, the breaker cord has such elastic properties that the elongation when loaded with 1.0 kgf/cord, is in a range of 0.5 to 1.5%, more preferably 0.8 to 1.2%; and the tangential modulus of elasticity (or modulus of elasticity in shear) when loaded with 10 kgf/cord, is in a range of 8,000 to 15,000 kgf/sq.mm.

Because such highly extensible cords are used for the breaker, the strain caused at the breaker edges due to the difference in diameter between the tread center and tread shoulders is effectively alleviated, and as the result, the stress concentration on the breaker edges when the tread is subjected to repeated deformations from the unloaded state to the loaded state and vice versa is also alleviated.

In addition, the modulus of elasticity of the breaker cord when loaded with 10 kgf/cord is lower than that of the conventionally used compact steel cord in which steel filaments are twisted compactly, but it is higher than that of organic fiber cords such as nylon, polyester and the like. Because of the resultant well-balanced hoop effect of the breaker, the tire growth is controlled, and further the difference in rigidity between the carcass and the breaker is decreased so as to prevent the separation between them.

Moreover, as to the twist, the twisting pitch of the strand is set to be less than 3 mm, that is, the filaments are twisted one turn every 3 mm, and the twisting pitch of the cord is set to be less than 6 mm.

The 100% modulus (100M) of the coating rubber of the breaker ply is in a range of 30 to 70 kgf/sq.cm. When 100M is less than 30 kgf/sq.cm, the difference in rigidity between the breaker cord and the rubber becomes so large that the strain is induced between them. When 100M is more than 70 kgf/sq.cm, the rigidity of the breaker becomes too large so that the ply separation at the breaker edges is easily produced.

As explained above, in the present invention, because the breaker is composed of the highly extensible low elasticity modulus metallic cords in comparison with the conventionally used cords, the rigidity of the tire as a whole becomes uniform, and the stress due to the repeated deformation during running can be dispersed into a wide range, and as the result, the ply separation at the breaker edges can be effectively reduced.

Further, the breaker cords are arranged at 5 to 30 degrees, and more preferably 10 to 25 degrees, with respect to the equator of the tire. When the cord angle is smaller than this range, the rigidity of the tire tread portion is so increased that the rider strongly feels the impact caused by small pebbles on the road and roughness of the road, and the running stability as well as ride comfort becomes worse. Similarly, the steering stability at high speed running also becomes worse when the cord angle is too large.

More, in the present invention, each bead portion can be provided with a triangular bead apex 8. The bead apex is disposed radially outside the bead core between the main portion and the turnup portions 5a, 5b of the carcass ply 5, and made of hard rubber having a shore hardness of 65 to 95, and further in order to increase the transverse stiffness of the tire, the bead apex is extended from the bead core into the sidewall portion.

Figure 2A:
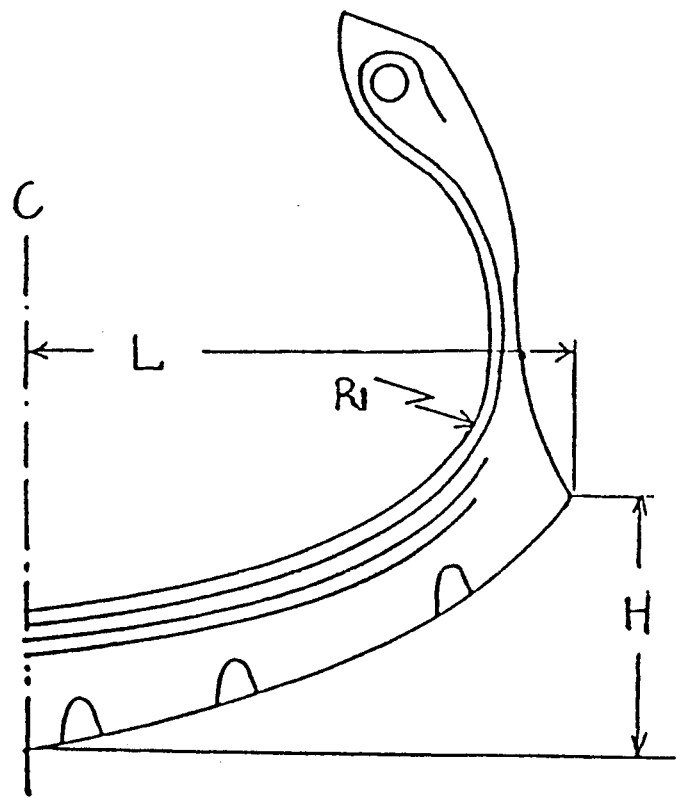
FIGS. 2(a) and 2(b) are sectional views roughly showing the tire profile at a ground contacting state and a free state.
Figure 2B:
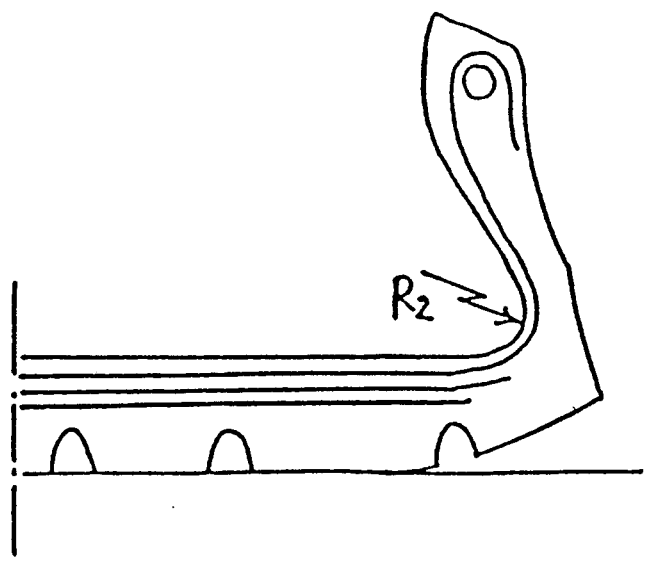

This invention is preferably applied to motorcycle tires of which the camber value is more than 0.2, more preferably more than 0.3, wherein, as shown in FIG. 2(a), the camber value is defined as the ratio (H/L) of the radial distance H between the tread edge and the tread center to the axial distance L between the tread edge and the equator of tire.

COMPARISON TEST

As working examples of the present invention, 140/8-17 rear motorcycle tires having the structure shown in FIG. 1 and partly modified, were manufactured by way of trial. The detailed specifications thereof are shown in Table 1.

As to the stability at high speed running, the speed at which the vehicle vibration was naturally generated during running on a test course was recorded, and the vibration was evaluated by a skilled test rider's feeling.

As to the durability at high speed running, the test was performed according to a test procedure specified in the JATMA safety standard for automobile tires. That is, while the tire is running at 80 km/h, both the tire load and the running time are increased step by step in the following manner: 100% loads for 4 hours as the first step, 110% loads for 6 hours as the second step, and 115% load for 24 hours as the third step, and successively the tire is continued to run under 200% load to the failure (separation between carcass and breaker), and the running time from the end of the third step to the time of tire failure is measured.

The motorcycle used in the field test was a HONDA VF100R provided with a 120/80 V 16 cross ply tire on the front wheel, and each test tire of Table 1 was mounted on the rear wheel, and then the performance thereof was evaluated.

The results of the above tests are also given in Table 1.

TABLE 1

|  | Working Ex. 1 | Working Ex. 2 | Working Ex. 3 |
| --- | --- | --- | --- |
| Carcass | Radial | Radial | Radial |
| Ply number | 2 plies | 2 plies | 2 plies |
| Cord angle *1(deg) | 88 | 88 | 88 |
| Cord material | Nylon | Polyester | Nylon |
| Denier | 2/1260D | 2/1260D | 2/1500D |
| 100M of coating rubber (kgf/sq. cm) | 50 | 50 | 50 |
| Count (cords/5 cm) | 50 | 50 | 48 |
| Breaker |  |  |  |
| Ply number | 2 plies | 2 plies | 2 plies |
| Width (mm) | 160/146 | 160/146 | 160/146 |
| Cord angle *1(deg) | +22/−22 | +22/−22 | +22/−22 |
| Cord material | Steel | Steel | Steel |
| Cord structure | 3 × 3 × 0.15 | 3 × 3 × 0.15 | 3 × 3 × 0.15 |
| Twisting pitch(mm) (strand X cord) | 2.2 S × 5.0 S | 1.5 S × 3.5 S | 2.5 S × 5.0 S |
| Elongation @ 1 kgf | 0.9% | 1.1% | 0.9% |
| Tangential modulus of elasticity @ 10 kgf (kgf/sq. mm) | 12,800 | 9,900 | 12,800 |
| 100 M of coating rubber (kgf/sq. cm) | 40 | 40 | 40 |
| Count (cords/5 cm) | 45 | 45 | 45 |
| Bead apex |  |  |  |
| Hardness | 92 | 92 | 92 |
| Top height from bead base (mm) | 50 | 50 | 50 |
| TEST RESULTS |  |  |  |
| Vibration naturally generating speed (km/h) | 200 | 200 | 200 |
| Stability at disturbance | converged | converged | converged |
| Durability (hrs) | 23 | 28 | 22 |
| Condition of metal cords after durability test completed | No damage | No damage | No damage |

|  | Working Ex. 4 | Ref. tire 1 | Ref. tire 2 |
| --- | --- | --- | --- |
| Carcass | Radial | Radial | Radial |
| Ply number | 2 plies | 3 plies | 2 plies |
| Cord angle *1(deg) | 88 | 88 | 88 |
| Cord material | Rayon | Nylon | Polyester |
| Denier | 2/1650D | 2/1260D | 2/1500D |
| 100M of coating rubber (kgf/sq. cm) | 50 | 50 | 50 |
| Count (cords/5 cm) | 49 | 50 | 48 |
| Breaker |  |  |  |
| Ply number | 2 plies | 3 plies | 2 plies |
| Width (mm) | 160/146 | 160/146 | 160/146 |
| Cord angle *1(deg) | +22/−22 | +22/−22 | +22/−22 |
| Cord material | Steel | Steel | Steel |
| Cord structure | 3 × 3 × 0.15 | 1 × 2 × 0.32 | 1 × 5 × 0.25 |
| Twisting pitch(mm) | 2.5 S × 5.0 S | 1.5 S | 9.3 S |

TABLE 1-continued

| (strand X cord) |  |  |  |
| --- | --- | --- | --- |
| Elongation @ 1 kgf | 0.9% | 0.3% | 0.1% |
| Tangential modulus of elasticity @ 10 kgf (kgf/sq. mm) | 12,800 | 7,100 | 18,000 |
| 100 M of coating rubber (kgf/sq. cm) | 40 | 40 | 40 |
| Count (cords/5 cm) | 45 | 45 | 45 |
| Bead apex |  |  |  |
| Hardness | 92 | 92 | 92 |
| Top height from bead base (mm) | 50 | 50 | 50 |
| TEST RESULTS |  |  |  |
| Vibration naturally generating speed (km/h) | 200 | 190 | 170 |
| Stability at disturbance | converged | converged | converged |
| Durability (hrs) | 25 | 20 | 18 |
| Condition of metal cords after durability test completed | No damage | Cords broken | Cords broken |

As described above, according to the present invention, the motorcycle tire is provided with a carcass of a radial structure, and the breaker is composed of the metallic cords of which elongation and tangential modulus of elasticity are defined in specific ranges. Accordingly, the strain in the shoulder region is mitigated, and the rigidity of the tire as a whole becomes uniform. As a result, the ply separation at the breaker edge portions is effectively prevented. Furthermore, the tire is provided in each bead portion with a bead apex made of hard rubber extending toward the sidewall portion, whereby the lateral stiffness of the tire is increased, and the drawback of the conventional radial tire is eliminated. As the result, the camber thrust is increased while providing for the rider stable cornering, and the so-called "wobbling phenomenon" is effectively prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A radial tire for a motorcycle having improved steering stability at high speed and reduced ply separation at the breaker edges of the tire which comprises a radial carcass extending between bead portions of the tire; a tread disposed radially outside the carcass; and a breaker disposed between the carcass and the tread and having at least one ply of metallic cords coated with rubber; each metallic cord comprising a plurality of twisted strands; each strand consisting of at least three twisted filaments made of metal; the elongation of each metallic cord when loaded with 1.0 kgf/cord being in a range of 0.5 to 1.5%; the tangential modulus of elasticity of each metallic cord when loaded with 10 kgf/cord being in a range of 8,000 to 15,000 kgf/sq.mm.

2. The tire as set forth in claim 1, wherein the 100% modulus of said coating rubber for the breaker cords is in a range of 30 to 70 kgf/sq.cm.

3. The tire as set forth in claim 1 or 2, wherein said filaments are made of steel, and the twisting pitch of each cord is less than 6 mm, and the twisting pitch of each strand is less than 3 mm.

4. The radial tire of claim 1, wherein the carcass has two plies, at least one ply of which is turned up in both edge portions around a bead cord within the bead portion of the tire, and terminates at a position in the bead portion or sidewall.

5. The radial tire of claim 4, wherein both plies are defined as radially inner and outer plies which are turned up in both edge portions, the end of the radially outer ply extending radially outward beyond the end of the radially inner carcass ply.

6. The radial tire of claim 4, wherein the carcass plies are arranged at not more than 20 degrees to the radial direction of the tire.

7. The radial tire of claim 4, wherein the carcass plies are organic fiber cords having a modulus of elasticity of 200 to 1500 kgf/sq.mm.

8. The radial tire of claim 4, wherein the carcass plies are organic fiber cords having a modulus of elasticity of 200 to 1500 kgf/mm$^2$, said cords being arranged substantially parallel with each other and embedded in rubber, which 100% modulus ranges from 25 to 75 kgf/sq.cm at a density of from 35 to 60 cords/5 cm.

9. The radial tire of claim 2, wherein at least one ply of the breaker cords has substantially the same width as the tread.

10. The radial tire of claim 1, wherein each strand has a twisted pitch of less than 3 mm and each cord has a twisted pitch of less than 6 mm.

11. The radial tire of claim 1, wherein the breaker cords are disposed at an angle of 5 to 30 degrees with respect to the equator of the tire.

12. The radial tire of claim 1, having a camber value of more than 0.2, said camber value being defined as the ratio (H/L) of the radial distance H between the tread edge and the tread center to the axial distance L between the tread edge and the equator of the tire.

* * * * *